United States Patent
Lai

(10) Patent No.: US 6,700,942 B1
(45) Date of Patent: Mar. 2, 2004

(54) PARALLEL AUTOMATIC SYNCHRONIZATION SYSTEM (PASS)

(75) Inventor: Benny W. H. Lai, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/343,312

(22) Filed: Jun. 30, 1999

(51) Int. Cl.[7] .................................................. H04L 7/00
(52) U.S. Cl. ........................................................ 375/354
(58) Field of Search ................................. 375/214, 211, 375/355, 354

(56) References Cited

U.S. PATENT DOCUMENTS 4,349,832 A * 9/1982 Gallo ........................... 348/500
4,821,097 A * 4/1989 Robbins ....................... 348/485

* cited by examiner

Primary Examiner—Mohammad H. Ghayour
Assistant Examiner—Pankaj Kumar

(57) ABSTRACT

A parallel automatic synchronization system includes a variable delay devices for receiving and variably delaying N parallel transmitted channel data words over repetitive clock cycles in response to a synchronization latch clock and for synchronously clocking out the parallel data words by a local reference clock (FREF); sync logic devices for receiving repetitive control clocks corresponding to the transmitted channel data words, including a remote recovered clock (FFRM) and the local reference clock (FREF) and for generating the synchronization latch clock which determines the delay position of the variable delay of the delay devices; and output latch devices for clocking out the parallel data words from the variable delay devices with the local reference clock (FREF).

7 Claims, 11 Drawing Sheets

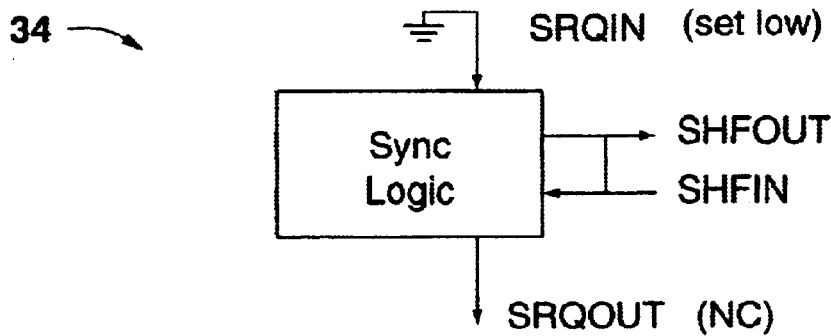
Single Channel Configuration A
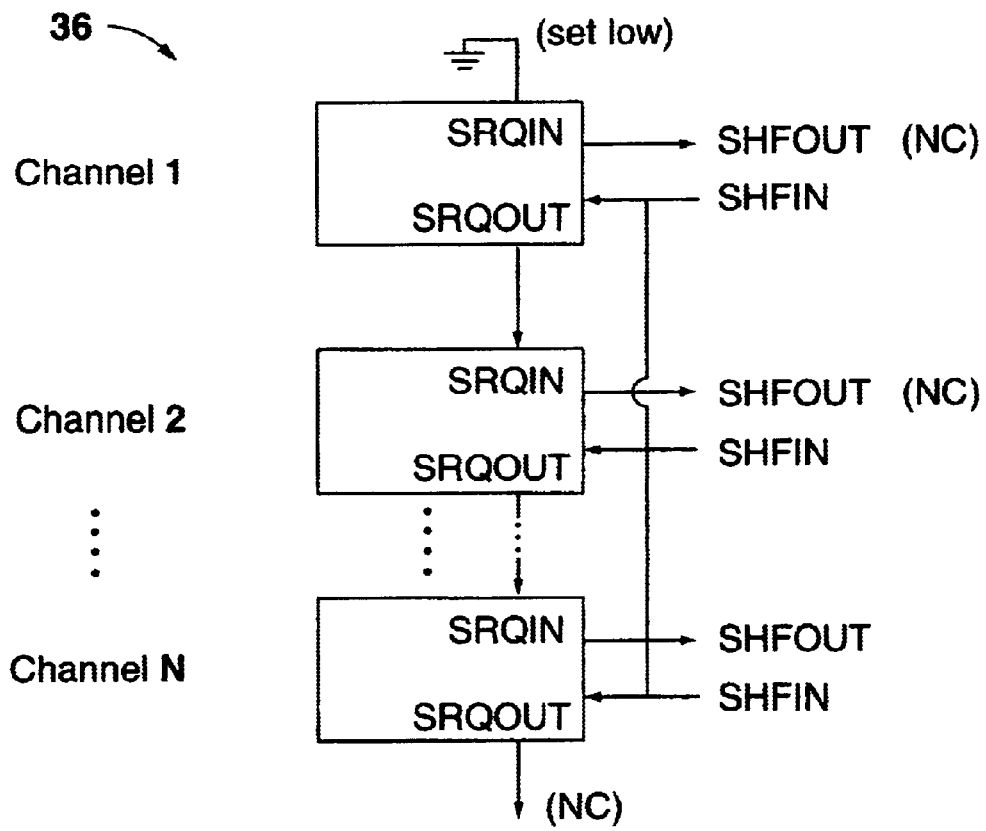
Multi-Channel Configuration B
*Fig. 5* case when fref is at ffrm=0
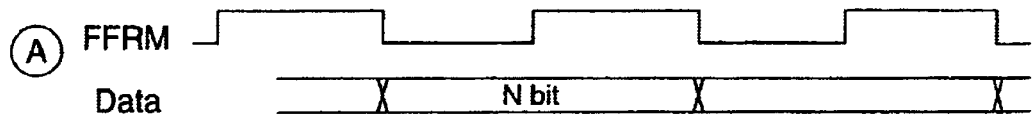
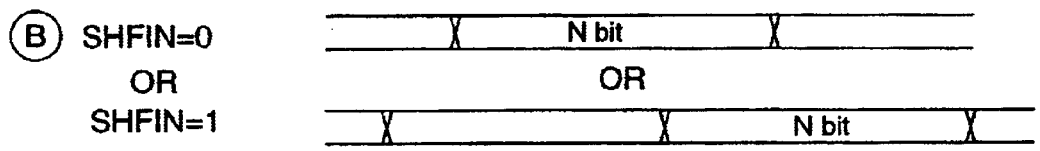
REFCHK
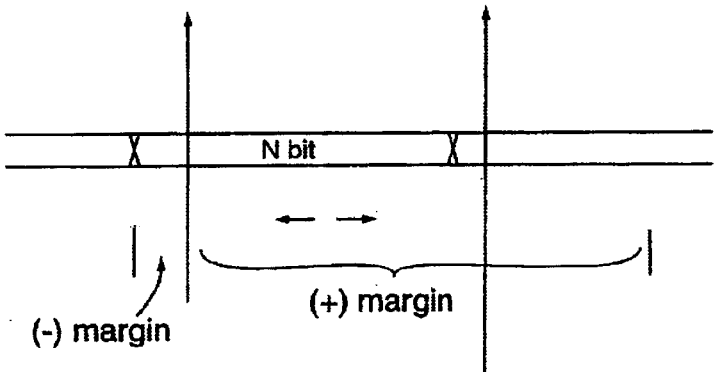
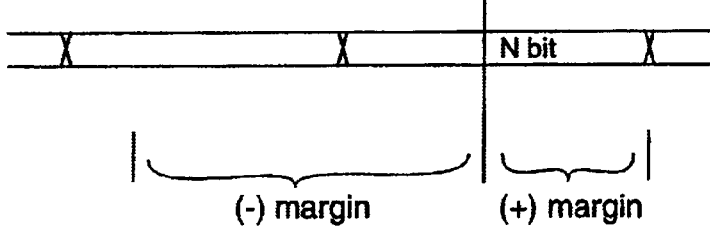
SHFIN=1 is better
*Fig.* 8 case when fref is at ffrm=1
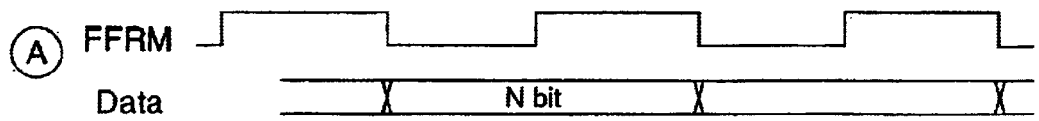
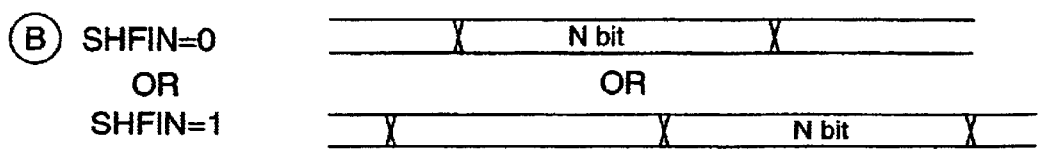
REFCHK
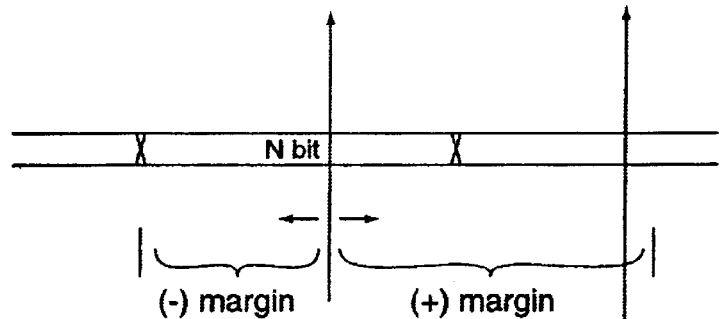
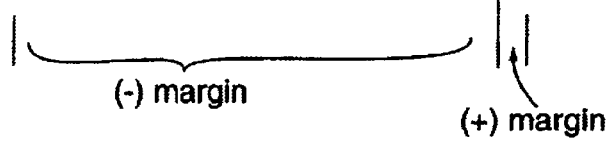
SHFIN=0 is better
*Fig* 9

PARALLEL AUTOMATIC SYNCHRONIZATION SYSTEM (PASS)

BACKGROUND OF THE INVENTION

There is an increasing need to transport more and more data at higher and higher speeds. To overcome costs and power of using multiple cables, low-cost serializer and deserializer (SerDes) chips and chipsets have emerged, which basically time-multiplex, or serialize the parallel word, and transmit this data over a single conduit. At the receiver, the parallel word is deserialized and reassembled. Often, a coding method is incorporated in the serialization and deserialization process to insure DC balance.

Such is the case with Hewlett-Packard's GLink-LT chip set, which can transport 16 bits of parallel data above 75 MB/sec over a single conduit. The GLink-LT chip set consists of a Tx chip, which serializes the parallel word using HP's CIMT coding scheme, and an Rx chip, which deserializes and decodes the stream back to its original word. With a 4-bit coding overhead, the serial bit stream operates at bit rates above 1.5 GB/sec.

However, users have already taken advantage of the increase in throughput, and are using multiple channels of these high-speed lines. An example is to utilize 4 separate channels to transport 64 bits.

Consider the case where we have a synchronous transmission system, where we have multiple high speed serial channels from the transmitter to the receiver, and a clock brought from the receiver to the transmitter side, as shown in FIG. 1. This type of system is often used in a remote sensing environment, where a continuous stream of data is transported back to the local site for processing. The remote site could contain multiple sensors with data converters (A/D's) and clocked with the transmitter clock. The local clock at the receiver side drives the ASIC which reads in the parallel words from the deserializers.

In this configuration, two problems in time alignment need to be overcome.

A. Unknown Recovered Data to Local Clock Phase

First, note the parallel data at the output of the deserializer is referenced off the transmitter's clock. The phase of the parallel data relative to the local clock depends on the delay times of the serial link. Thus, a system is needed to absorb the phase discrepancy of the parallel word at the deserializer, and be resynchronized to the local clock, so that it could be read in to the ASIC properly.

Although it is possible to use the recovered clocks to drive the receiver side, this clock is often jittery due to the recovering process. Also, if the link fails (i. e., cut cable), the receiver side would not have a clock. Thus, the receiver side is clocked by its own local clock.

B. Word Reassembly Uncertainty for Multiple Channel

When the parallel words at the deserializer are resynchronized to the local clock, a decision is required to advance or delay a given word if the local clock sample is near the word boundary. Since the latency delays of each channel can differ somewhat due to physical cable differences, there exists a possibility that the words from the multiple channels from differing time slots could be incorrectly reassembled.

To illustrate this, consider FIG. 2. At the transmitter, words (a1-b1-c1-d1) and (a2-b2-c2-d2) are sent. Upon reassembly at the receiver the reassembled words are (a1-b2-c1-d1), which mixed words from different time slots.

Thus, the method which resolves the first problem (A) must not operate independently, but work collectively. A system of arbitration is needed so that a common resolution on the phase adjustment is made so that the word reassembly are not from different time slots.

III. Classical Solution:

The classical solution to synchronize the deserializer parallel output to the local clock is to feed the parallel data into a FIFO. Then the output of the FIFO is read out with the local clock. This overcomes the time boundary issue for one channel, but does not address the skew between the high speed channels.

The classical method to overcome the word reassembly problem is to use a time marker, whereby one bit of the word is reserved for a time stamp for each channel. For example, this bit only goes high for one bit over a long duration. By looking for this marker, the words from the same time slot could be reassembled with certainty.

Another method is to insert a common word across all channels at the transmitter at the same time slot. This then can be used as a time marker as the words are reassembled at the receiver ASIC. However, this requires that the continuous data must be occasionally interrupted to insert this word, thus requiring logic and memory to buffer the unsent data.

Implementing these solutions obviously takes much more extra hardware, and careful timing considerations in the ASIC designs. In addition, the time stamp bit required gives up one bit per channel.

SUMMARY OF THE INVENTION

It is an object of the present invention to provide a parallel automatic synchronization system.

In one embodiment, the parallel automatic synchronization system includes a variable delay means for receiving and variably delaying N parallel transmitted channel data words over repetitive clock cycles in response to a synchronization latch clock and for synchronously clocking out the parallel data words by a local reference clock (FREF); sync logic means for receiving repetitive control clocks corresponding to the transmitted channel data words, including a remote recovered clock (FFRM) and the local reference clock (FREF) and for generating the synchronization latch clock which determines the delay position of the variable delay of the delay means; and output latch means for clocking out the parallel data words from the variable delay means with the local reference clock (FREF).

Other objects, features and advantages of the present invention will become apparent from the following detailed description when taken in conjunction with the accompanying drawings.

BRIEF DESCRIPTION OF THE DRAWINGS

The accompanying drawings where like numerals indicate like components and which are incorporated in and form a part of this specification, illustrate embodiments of the invention and, together with the description, serve to explain the principles of the invention:

FIGS. 5A and 5B show single channel and multi-channel configurations of the present invention.

FIGS. 8 and 9 are timing diagrams showing when the rising edge of FREF is at FFRM=0 and 1, respectively.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

PASS System Overview

In one embodiment, the system according to the present invention is incorporated into a GLink-LT Rx deserializer chip as described above. In addition to providing the solution for timing synchronization, it also could be daisy chained and configured such that a common decision across the multiple channels on word delays in the resync process is made, which ensures proper word reassembly. In this implementation, the word is 16 bits wide, and the channel skew between channels is 20% of the word period when the link initiates. In addition, when the margin is exceeded due to environmental changes, the system will reset, and the resync process is repeated. The new margin upon a slip condition is 40%.

Normally, the Rx presents to the user the parallel output at the word rate, which is synchronous with the remote clock based on the high speed serial data. This new PASS feature, when enabled, senses the phase of the local clock fref (at the same parallel word rate) and adjusts the delay of the parallel data; furthermore the final parallel output is clocked out by the local reference clock. The phase adjustment ensures that the data is never clocked out near a transition.

System Features:
1. The phase of the parallel data is adjusted such that the transition zone of the data is avoided. This is done by delaying the data discretely when it is necessary.
2. For multiple receivers working in parallel, these receivers could be daisy chained and configured such that the selection of the phase assignment is identical across all receivers, even though some receivers are before and others are after the transition zone.
3. This decision remain active and tracks the phase variation of the serial data over a margin range of +/−4 bits minimum.
4. When the range margin is exceeded due to catastrophic conditions (ie lightning storms, or extreme temperatures), the PASS system logic detects the fault, and is able to recover from this by re-initiating the synchronization process.

V. Block Description

Figure 1:
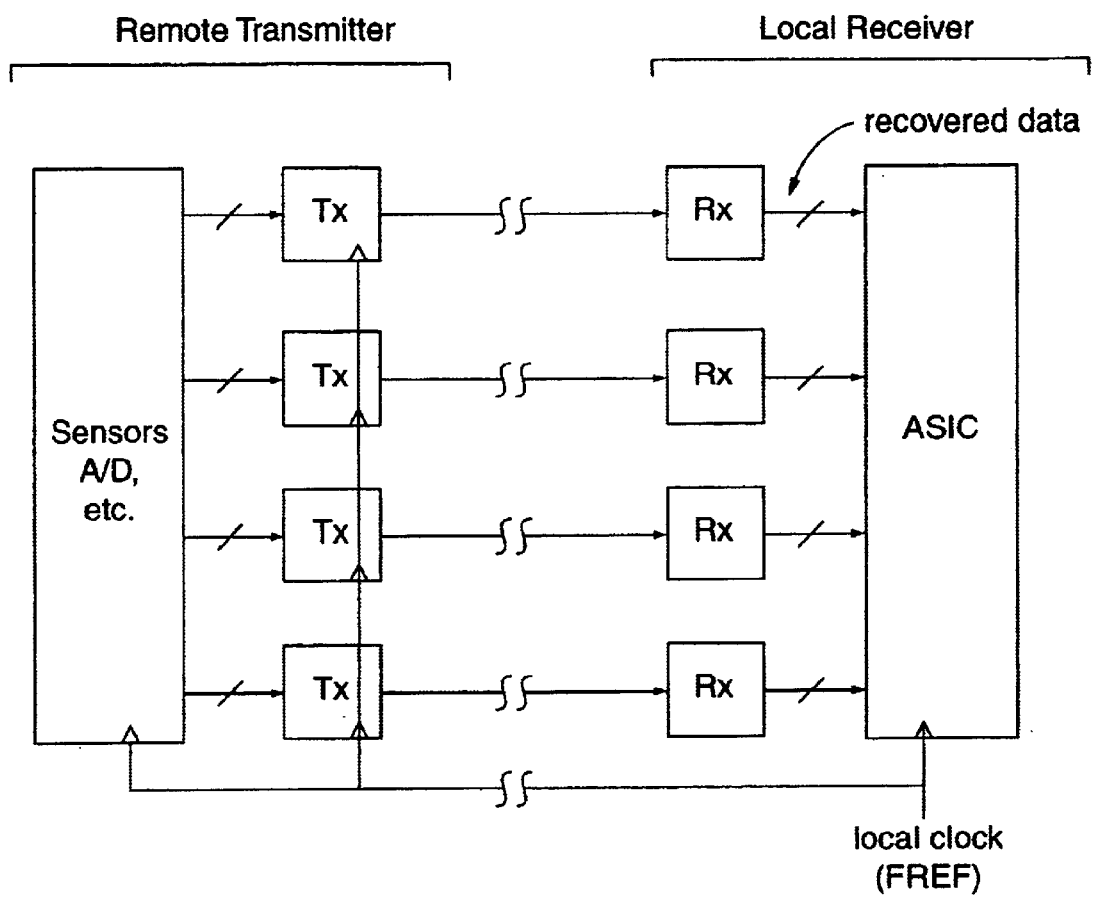
FIG. 1 shows a block diagram of a synchronous transmission system using multiple simplex links.
Figure 2:
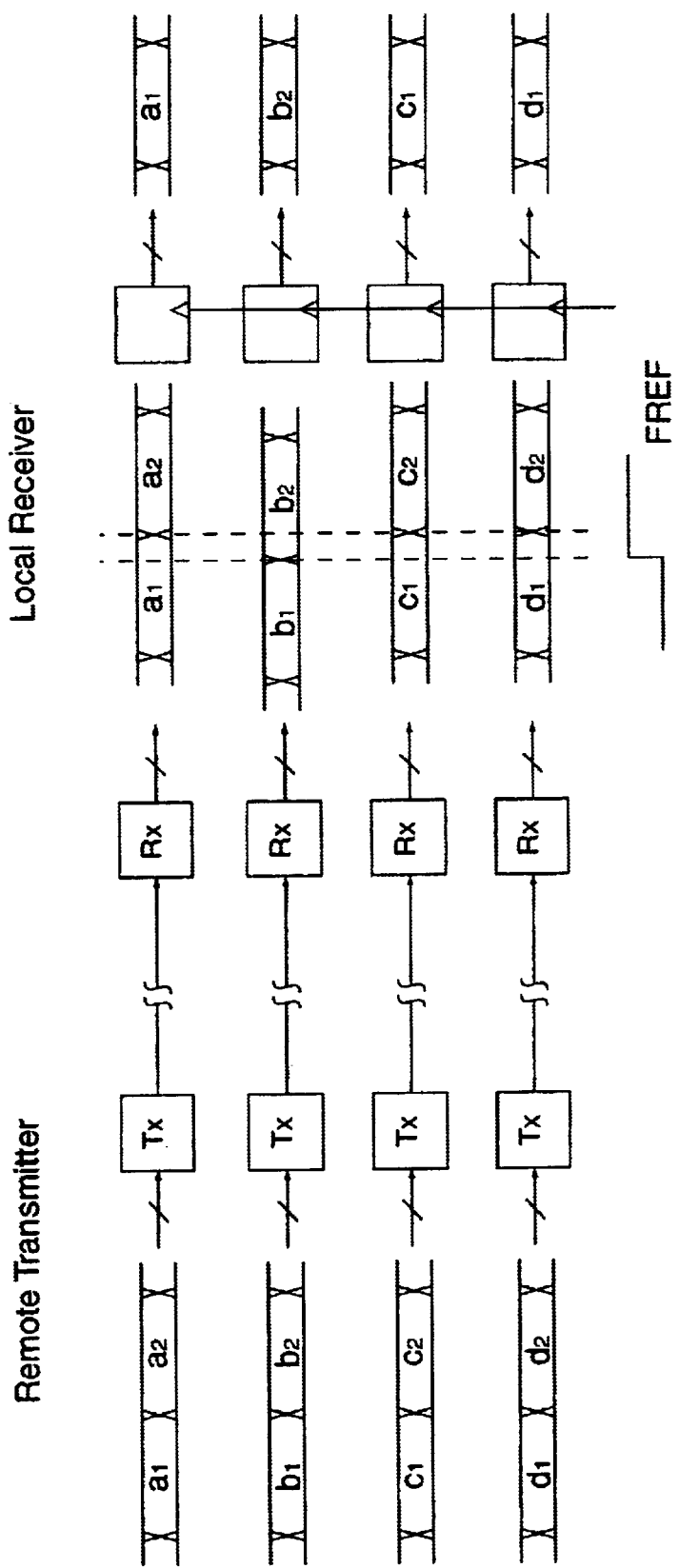
FIG. 2 is a timing diagram showing skewing in data transmission.
Figure 3:
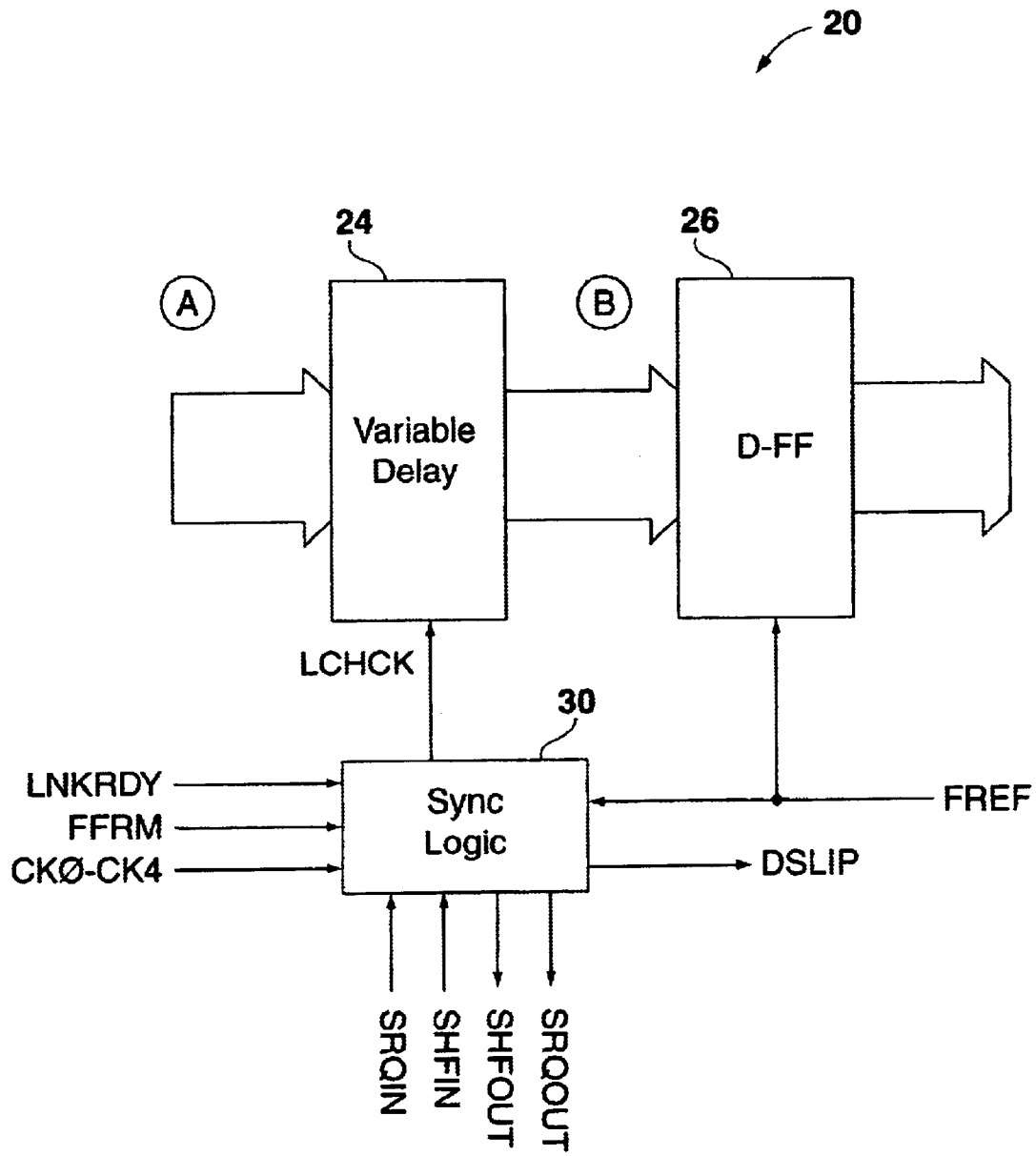
FIG. 3 is block diagram of a parallel automatic synchronization system according to the present invention.

The basic block diagram for a PASS system 20 is shown in FIG. 3. It includes a parallel variable delay block 24, a bank of D-flip/flops 26, and a synchronization logic block 30. The parallel data is clocked out by the falling edge of the recovered clock FFRM. Since the heart of the PASS system 20 is the sync logic block 30, an overview is first presented, followed then by a more technical description.

A. Variable Delay Block 24

Figure 4:
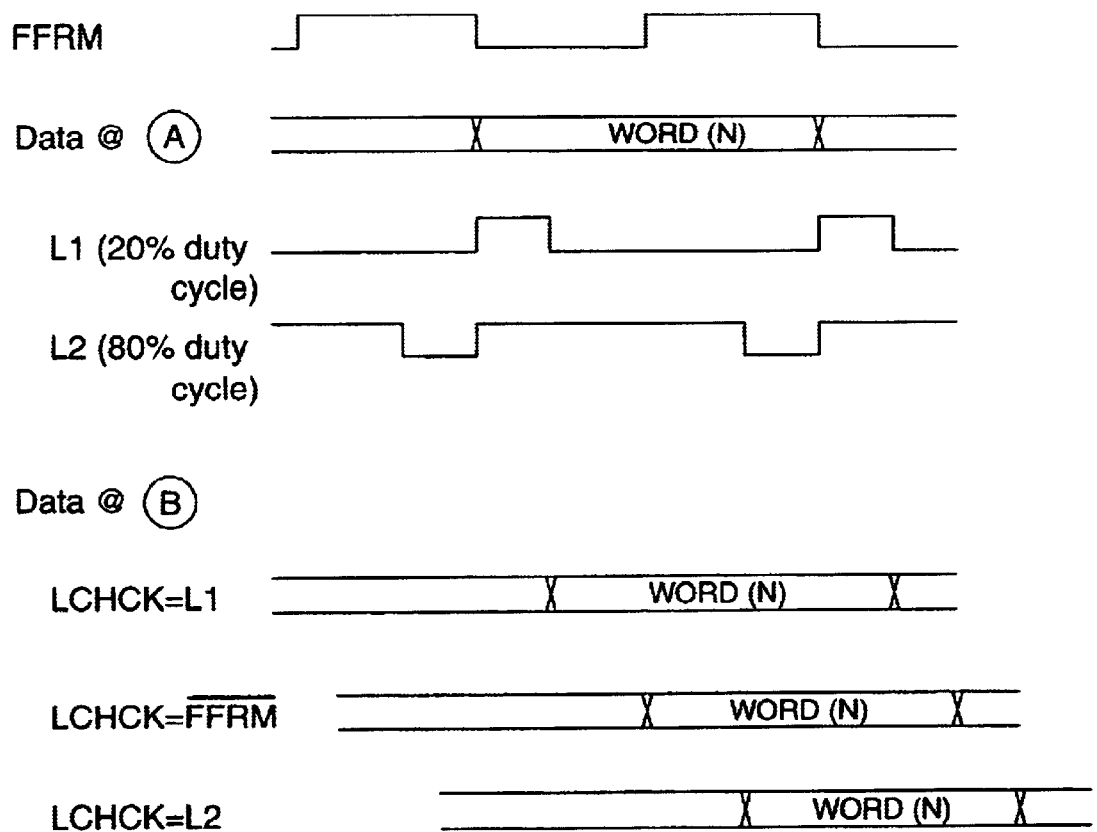
FIG. 4 is a timing diagram showing different duty cycles.

The 16-bit parallel data recovered and decoded by the deserializer is the input to this delay block, whose delay can be selected between three different states, fully retracted, midway, and fully extended. The delay bank is simply a set of latches, whose latch clock are selectable between three sets of clocks which have duty cycles of 20%, 50%, and 80% of the word period, with a 20% margin reserved for setup/hold times for the flip/flops, as shown in FIG. 4.

In this implementation of the variable delay block 24 the maximum delay range is utilized for a single bank of latch. Extending the range further is possible with multiple latches.

B. Output D-Flip/Flop 26

This is simply a bank of output d-flip/flops which clocks out the parallel word from the variable delay block, with the rising edge of local clock, FREF.

C. Synchronization Logic 30 Overview

This block 30 is responsible for the decision on what delay position to set the variable delay block. Below is an overview of the operating principles. The next section will describe the implementation in more technical details.

Logic inputs are: The remote recovered clock (FFRM)

The local clock (FREF)

Link ready (LNKRDY)

Shift command from the master (SHFIN)

Shift request from a peer (SRQIN)

Logic output are: Shift request output (SRQOUT)

Shift command output (SHFOUT)

Data slip (SLIP)

Other inputs include various clocks which are derived together with FFRM, which defines time zones of the data word. By comparing the rising edge of FREF to these time zones, an optimum delay position can be determined for the parallel delay block. The latch clock is then generated to control the state of the variable delay block.

When the FREF clock is near a transition zone, a unanimous decision is needed to set the variable delay line. It first issues a shift request output to its peer (SRQOUT=1), and also output a SHFOUT command, the delay position. In a single channel system 34 shown in FIG. 5A, the SHFOUT is connected to SHFIN. Thus, the decision is self-contained. In a multiple channel configuration 36, each PASS logic is connected via a daisy chain connection with one SRQOUT passing to the next SRQIN as shown in FIG. 5B.

The last PASS logic is configured as the master, whose SHFOUT command is connected to SHFIN inputs of PASS logic inputs including itself. The SHFIN input is only active when FREF clock is near a transition zone. The SHFIN determines the delay block setting:

SHFIN=0 set delay at retracted (20%) delay,

SHFIN=1 set delay at extented (80%) delay.

When FREF is safely away from the transition zone, the delay setting defaults to 50% delay, ignoring the SHFIN completely.

Upon startup, an initial SHFOUT state is chosen by the master. When the link is ready as indicated by LNKRDY=1, the choice of SHFOUT remains constant until a transition zone is detected by any one of the peers, whose shift request is propagated to the master. The master then responds by updating the SHFOUT.

When a transition zone is detected by any one of the peers, and the delay is already at the min or max setting, and can no longer accommodate further reduction or extension, a SLIP=1 condition is flagged. The normal shift request is also issued, resulting in the master reoptimizing a new SHFOUT position.

D. Synchronization Logic Technical Description

Figure 6:
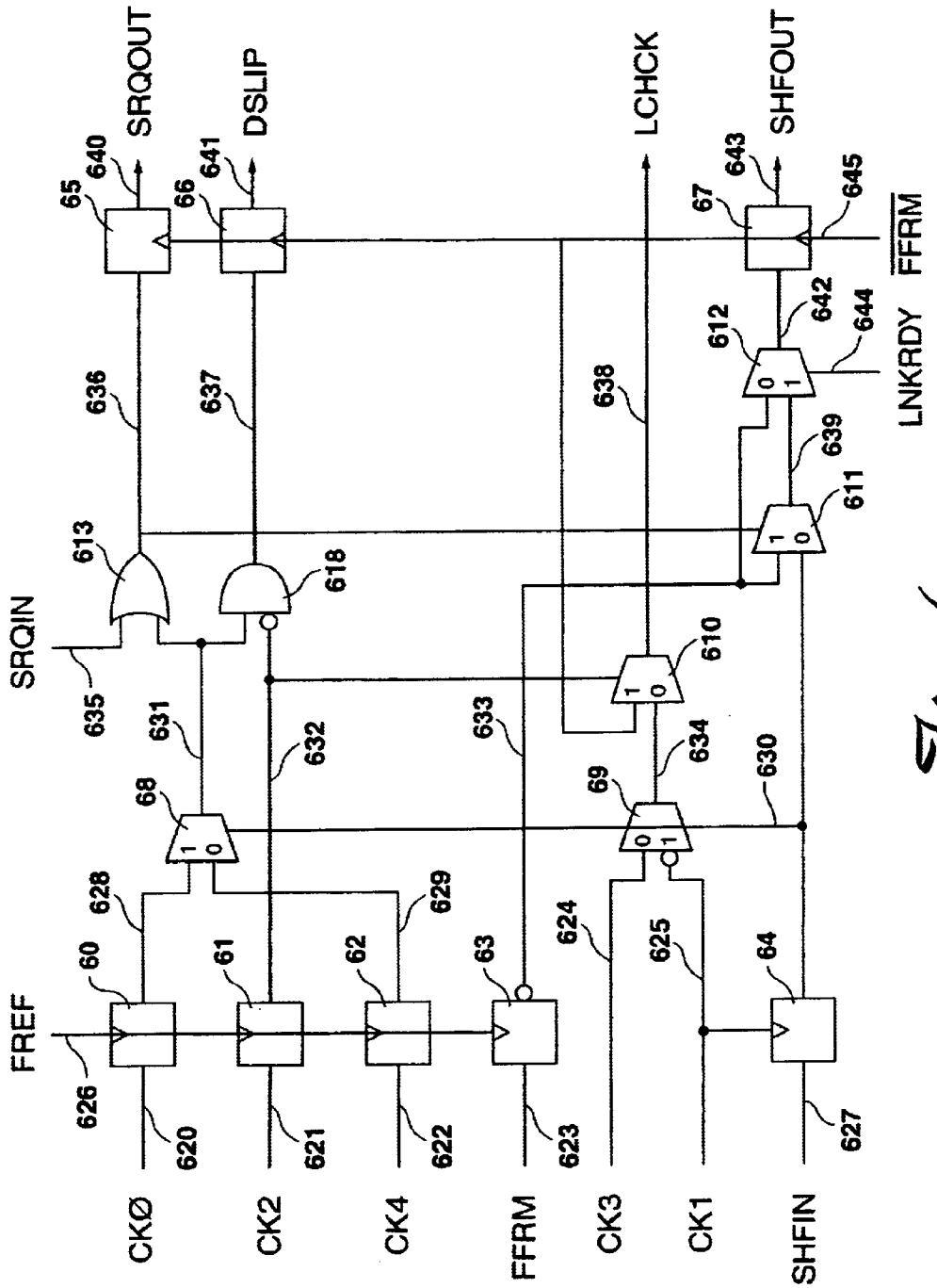
FIG. 6 shows a schematic diagram of sync logic according to the present invention.
Figure 7:
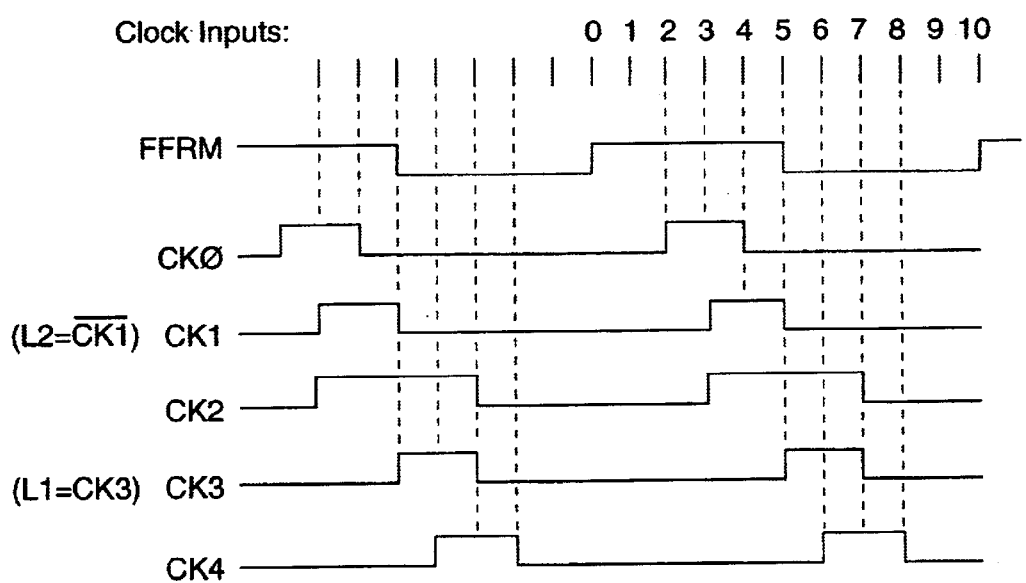
FIG. 7 is a timing diagram showing sync logic clock inputs for FIG. 6.

The schematic diagram of the Sync Logic is shown in FIG. 6. The clock inputs are shown in FIG. 7.

The clock inputs CK0–CK4 are derived together with FFRM as provided by the deserializer/decoder portion of GLink-LT Rx chip. The relative position of CK0–CK4 spans the critical time zones needed for the sync logic to operate. If we subdivide the FFRM clock period by 10, starting with the rising edge, CK0 is high at time 2–4, CK1 from 3–5, CK2 from 3–7, CK3 from 5–7, and CK4 from 6–8.

Note that CK0, CK2 and CK4 are overlapping pulses, and are used for defining the time zones for FREF. CK1 and CK3 are used primarily to derive the lchck clocks L1 and L2.

1. Determining Position of FREF

As the relative position of FREF to FFRM varies, the sync logic must be able to detect it and respond accordingly.

Referring to the schematic, CK0, CK2 and CK4 are clocked in by the local clock FREF with flipflops 60, 61, and 62. Thus their outputs (signals 628, 632 & 629) give a direct indication on the location of the rising edge of FREF relative to the parallel word input.

The safe zone is defined by CK2. The transition zones are defined by either CK0 and CK4 depending on the state of the delay line, as determined by SHFIN. If SHFIN=0, then the transition zone is defined by CK0. If SHFIN=1, then the transition zone is defined by CK4.

This is done by selector gate 68, to form signal 631. This signal goes high if FREF is within a transition zone.

Note that the transition zone brackets around the transitions of the data word at the output of the variable delay block.

2. Algorithm for Finding Optimal Delay

Consider the case when the rising edge of FREF is at FFRM=0, as shown in. FIG. 8. The input data word along with FFRM is shown in the top traces. The delayed data for SHFIN=0 (retracted) and SHFIN=1 (extended) along with their corresponding margins are also shown. Here if SHFIN=0 is chosen, the (−) margin is rather small, even though its (+) margin is really large. If SHFIN=1 is selected, then the margins are more balanced. The minimum margins for the SHFIN=1 case (+margin) is much better than the SHFIN=0 case (−margin). Here SHFIN=1 is clearly the choice.

Now, repeat the same process with the rising edge of FREF at FFRM=1, shown in FIG. 9. Now we have the opposite effect: SHFIN=0 have the more balanced margins as compared to SHFIN=1. Thus, SHFIN=0 is the proper choice.

Thus, the optimum choice for the delay is simply setting SHFIN to the opposite of the state of FFRM as sampled by FREF's rising edge.

Referring to the schematic, this is done by flip/flop 63, resulting in signal 633, which represents the optimal choice.

3. Lchck Selection and Generation

The latch clock lchck is generated with selector gates 69 and 610. If the FREF clock is within CK2, as indicated by signal 632, then the lchck is defaulted to the FFRM-bar.

Outside of this zone, the lchck depends on the SHFIN signal from the master, which results in signal 630, after begin clocked in by flip/flop 64. If 630 is low, then CK3 is chosen to be lchck. This is equivalent to L1 in FIG. 4.

If 630 is high, then CK1-bar is chosen. This is equivalent to L2 in FIG. 4.

Flip/flop 64 uses CK1 to clock in SHFIN, since the rising edge of CK1 is conveniently ahead of the falling edge of FFRM, allowing time for the logic states to settle and the proper lchck to be chosen before the data transitions begin.

4. SHFOUT Command Management

Upon LNKRDY, the selector 612 switches in this signal and generates SHFOUT. If this is the master, the SHFOUT is rewired back to the SHFIN, and is clocked in by flip/flop 64, which sets the state of the signal 630. This effectively latches the SHFOUT command until FREF has drifted into the transition zone, or a similar condition is reported via the SRQIN signal. Either of these conditions causes a shift request, or signal 636 going high, at which time selector gate 611 again chooses another optimum SHFOUT state.

As the master makes the new choice, the SHFOUT command is implemented across all channels, and transition zones are avoided. Again, the master keeps this SHFOUT until a transition zone condition is detected.

The shift request at signal 636 is clocked out to form SRQOUT, which allows this condition to be propagated to the master.

5. Data Slip Detection

When the variable delay is set to the minimum or maximum settings, and FREF has drifted to where it needs to be retracted or extended further, a data slip condition occurs. This condition is detected again by zones defined by CK0 when SHFIN=0 (retraced), and CK4 when SHFIN=1 (extended).

E. PASS System Dynamics and Margins

In this section, we will set the system in motion, and follow through dynamics of zone detection and the sync logic response. Also, depending on the initial SHFOUT choice, the margins for skew and allowed drift is also discussed. The master's SHFOUT is connected to all SHFIN's.

We assume the system is again connected in a Master Slave configuration, and that the sync logic of the slaves passes through their shift requests via the SRQOUT to SQRIN daisy chain. The slaves' SHFOUT are ignored, and the sync logic of the master is analyzed.

Since the rising edge of FREF relative to FFRM is arbitrary, we choose two extreme cases and move FREF left and right and determine their margins. In real life, however, FREF is held constant, and FFRM actually varies over environmental changes. For simplicity in discussion, here we hold FFRM fixed and vary FREF relative to FFRM. The margins calculated are ideal and would be smaller in actual circuits due to finite rise/fall and setup/hold times of the logic technology used in its fabrication.

Figure 10:
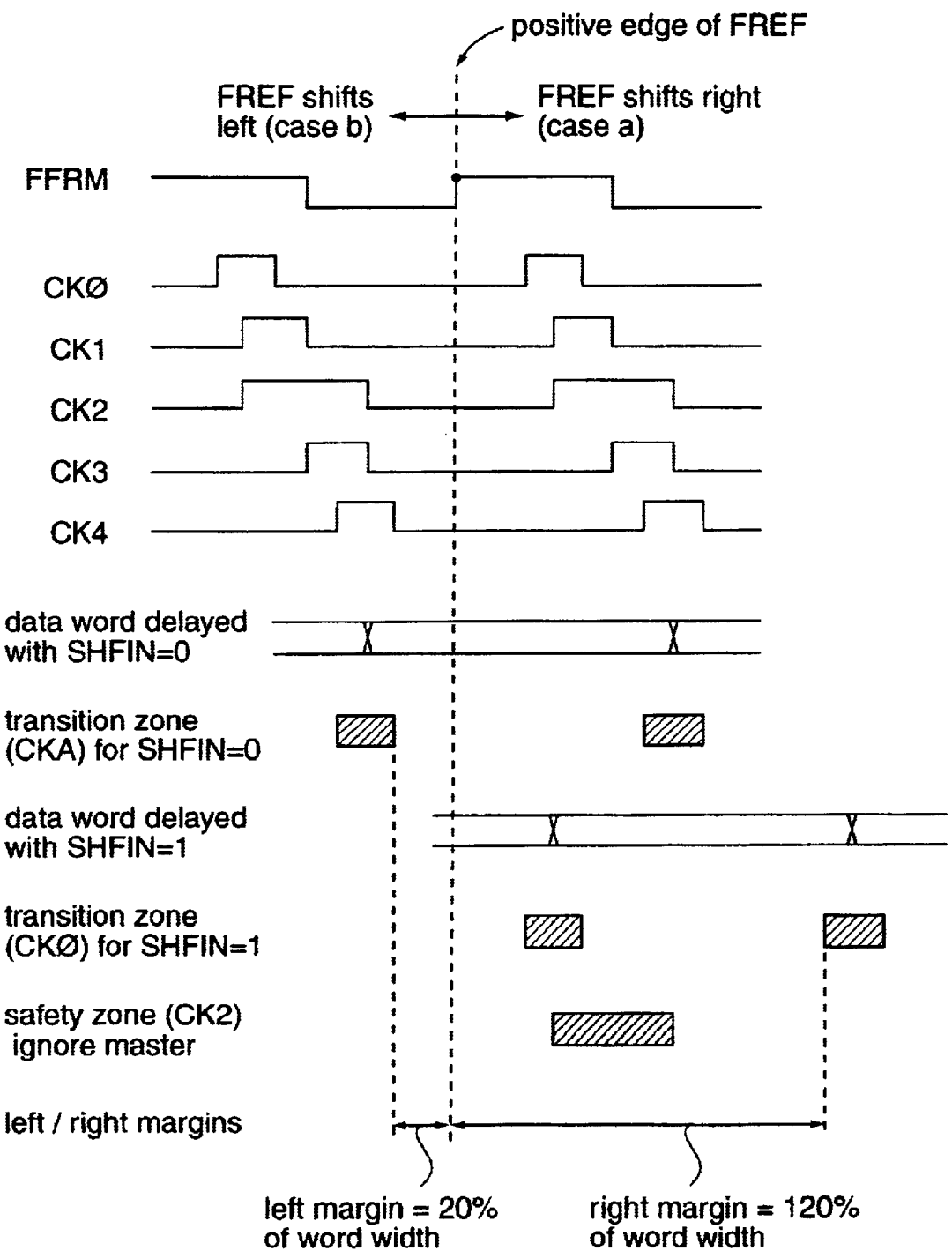
FIG. 10 shows a diagram of PASS system dynamics and margins.

First, lets put the rising edge of FREF just to the right of the rising edge of FFRM as shown in FIG. 10. As the link goes up with LNDRDY=1, the initial SHFOUT condition is set low.

a) FREF Shifts Right

As FREF shifts to the right relative to FFRM, it enters into the safe zone defined by CK2. In this zone, it ignores the SHFIN state and just chooses a 50% setting in the delay setting. Moving further to the right, FREF next enters into the transition zone as defined by CK3. It then initiates a shift request, and then a new SHFOUT is chosen. Since the rising edge of FREF now corresponds to where FFRM is low, the new choice of SHFOUT is high. As FREF moves out of the safe zone, the new SHFIN condition has been established, and the transition zone is avoided. Since SHFIN=1, the transition zone is updated as defined by CK0.

FREF could continue to shift right until the next transition zone is entered, at which a slip condition is flagged.

The total margin on the right is 120% of the word period.

b) FREF Shifts Left

Since the delay is totally retracted, moving FREF left will next enter the transition zone. The margin is 20%.

So in this case, the (−) margin is 20%, while the (+) margin is 120%. By symmetry, when we can place the rising edge of FREF just to the left of FFRM, and move the FREF clock left and right, we will get a (−) margin of 120% and a (+) margin of 20%.

Thus, the worst case is 20% after LNKRDY goes high.

Note however, that when the slip condition occurs, a shift request again is issued. Taking the example of b above, where FREF has move left while the SHFIN is already fully retracted. When FREF enters the transition from the left, a new shift request is also issued.

Since the rising edge of FREF now corresponds to where FFRM is low, the new optimal SHFOUT is high. At this new position, the new (+) margin is 40%, and (−) is 100%. By symmetry, one can see that after a slip condition has occurred, the new SHFOUT places the minimum margin to be at 40%.

Skew Tolerance

Figure 11:
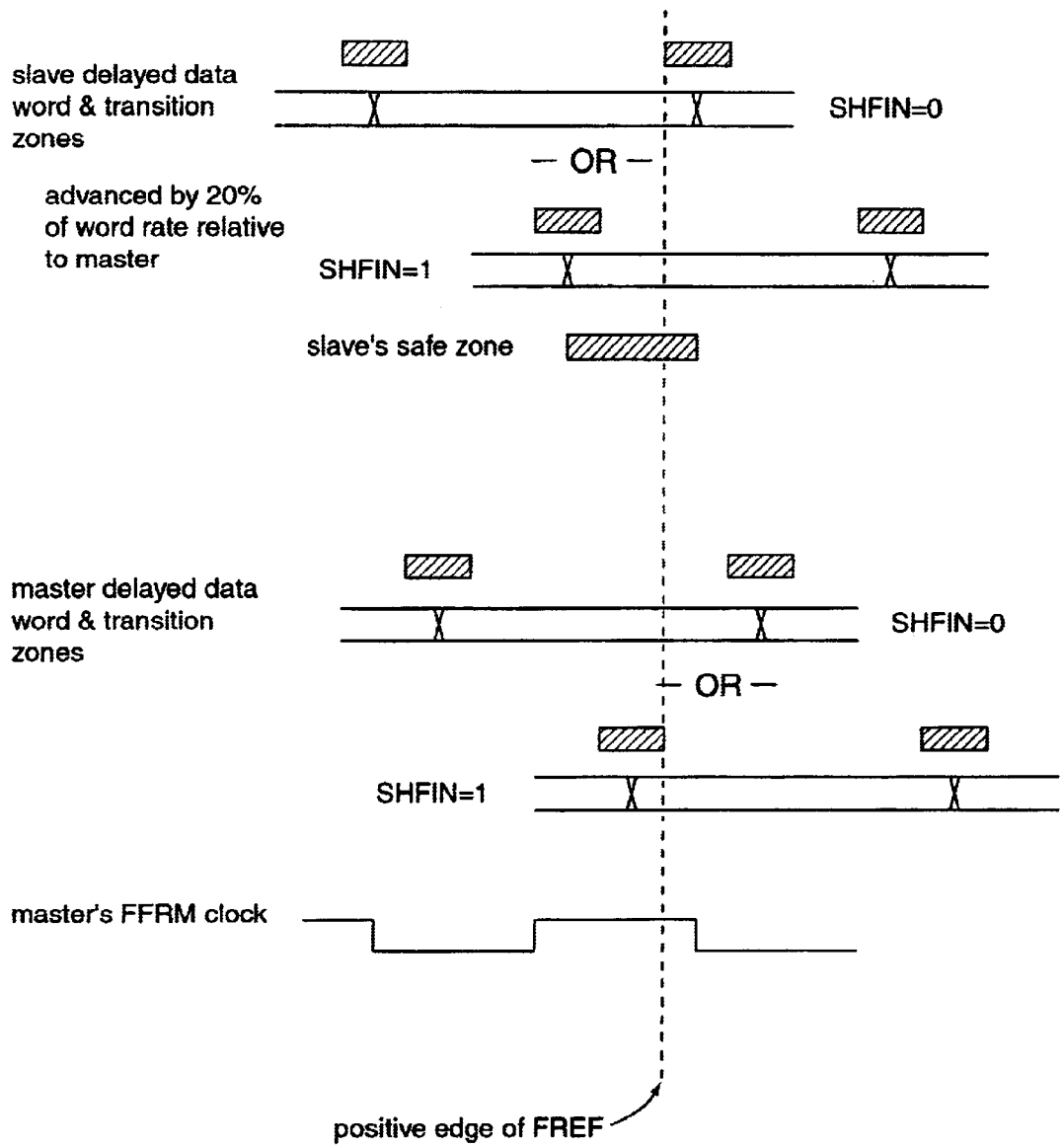
FIG. 11 shows a diagram of skew tolerance between master and slave channels.

A skew in the latency of the multiple channels relative to the master of up to 20% could be absorbed into this margin. To see this, consider the FIG. 11 where the slave is advanced by 20% of the data period.

With SHFIN=0, as the rising edge of FREF moves right and enters into the slave's transition zone, a shift request propagates to the master asking for a SHFOUT update. However, the mater's corresponding FFRM is still high, which results in the wrong delay position for the slave.

Since the setting of SHFIN is unchange, the slave will continue to issue shift requests. The slave is able to tolerate this condition while it is in the safe zone. FREF then continue to drift right up to the point where it just leaves the safe zone. The choice of FFRM of the master is now correct, and a SHFOUT=1 is generated. Thus, the maximum skew between channels is up to 20% of the data word period. Extending the skew tolerance is possible by extended the safe zone, without exceeding the transition zone. However in our present implementation, 20% margin was adequate. This made the logic very small and simple.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A parallel automatic synchronization system comprising:

variable delay means for receiving and variably delaying N parallel transmitted channel data words over repetitive clock cycles and for synchronously clocking out the parallel data words by a local reference clock (FREF), the variable delay means varying in response to a synchronization latch clock;

sync logic means for receiving repetitive control clocks corresponding to the transmitted channel data words, including a remote recovered clock (FFRM) and the local reference clock (FREF) and for generating the synchronization latch clock which determines the delay position of the variable delay of the variable delay means;

output latch means for clocking out the parallel data words from the variable delay means with the local reference clock (FREF).

2. The system as in claim 1 including means for sensing the phase of the local reference clock and means for discretely adjusting the delay of the parallel data words to ensure that the data words do not clock out during a clock transition.

3. The system as in claim 2 including multiple parallel daisy chained receivers configured such that the selection of the phase alignment is substantially identical for all multiple receivers.

4. The system as in claim 3 including means for tracking the phase variation of a predetermined range margin.

5. The system as in claim 4 including means for detecting when the range margin is exceeded and means for re-initiating the synchronization process.

6. A parallel automatic synchronization system comprising:

a parallel variable delay block that receives and variably delays N parallel transmitted channel data words over repetitive clock cycles in response to a synchronization latch clock and that synchronously clocks out the parallel data words using a local reference clock (FREF);

a synchronization logic block that receives repetitive control clocks corresponding to the transmitted channel data words, including a remote recovered clock (FFRM) and the local reference clock (FREF), and that generates the synchronization latch clock that determines a delay position of variable delay of the parallel variable delay block;

a bank of D-flip/flops that clocks out the parallel data words from the parallel variable delay block using the local reference clock (FREF).

7. A method of automatically synchronizing data, the method comprising:

receiving and variably delaying N parallel transmitted channel data words over repetitive clock cycles and synchronously clocking out the parallel data words by a local reference clock (FREF), wherein variably delaying is performed in response to a synchronization latch clock;

receiving repetitive control clocks corresponding to the transmitted channel data words, including a remote recovered clock (FFRM) and the local reference clock (FREF) and generating the synchronization latch clock that determines a delay position of variable delay of a parallel variable delay block;

clocking out the parallel data words using the local reference clock (FREF) after the parallel data words have been variably delayed.

\* \* \* \* \*